Figure 1:
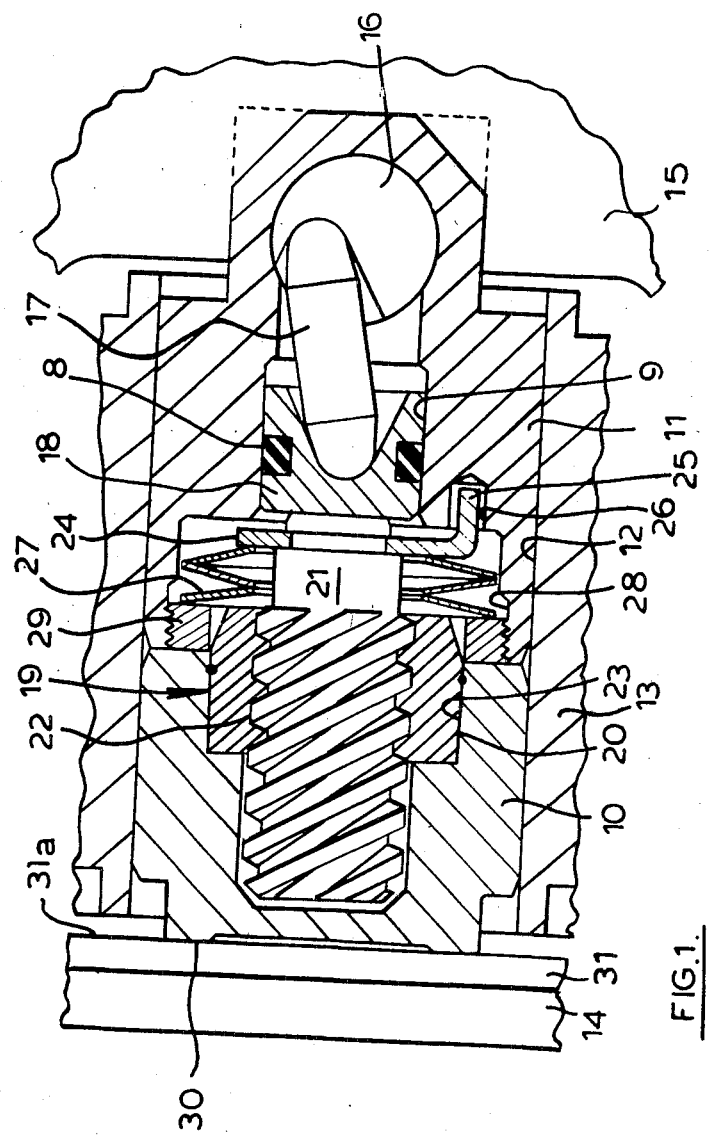

United States Patent

[11] 3,633,712

[72] Inventor Glyn Phillip Reginald Farr
    Kenilworth, England
[21] Appl. No. 44,331
[22] Filed June 8, 1970
[45] Patented Jan. 11, 1972
[73] Assignee Girling Limited
    Birmingham, England
[32] Priority June 18, 1969
[33] Great Britain
[31] 30,748/69

[54] VEHICLE BRAKE SYSTEMS
    12 Claims, 2 Drawing Figs.
[52] U.S. Cl. .................................... 188/71.9,
    188/196 D
[51] Int. Cl. ..................................... F16d 65/56,
    F16d 55/18
[50] Field of Search .......................... 188/71.8,
    71.9, 106 F, 196 D

[56] References Cited
UNITED STATES PATENTS

| | | | |
|---|---|---|---|
| 2,949,173 | 8/1960 | Peras | 188/196 D |
| 3,244,260 | 4/1966 | Frayer | 188/196 D |
| 3,488,687 | 1/1970 | Farr | 188/71.9 X |
| 3,550,732 | 12/1970 | Beller | 188/196 D |

Primary Examiner—Duane A. Reger
Attorney—Scrivener, Parker, Scrivener and Clarke ABSTRACT: The invention relates to an automatic slack adjuster for vehicle brakes including first and second screw elements having a reversible screw thread connection therebetween. The reversible screw thread effects automatic adjustment responsively to excess travel of the brake actuator piston whereby to automatically reduce the slack. To prevent over adjustment taking place due to brake deflection when applying the brakes heavily, the brake thrust is transmitted through friction surfaces which act as a clutch to prevent unwanted rotation at the screw thread connection.

VEHICLE BRAKE SYSTEMS

The present invention relates to an automatic adjuster for a vehicle brake system.

It is often desirable to incorporate an automatic adjuster for automatically taking up the slack which develops as wear of the brake lining takes place, especially in the case of a disc brake which is normally operated hydraulically but may also be operated mechanically e.g. by the hand brake. It has already been proposed to provide an automatic adjuster which incorporates a screw and nut with a reversible screw thread connection therebetween. It is usually necessary to provide a thrust bearing, such as a ball race, to permit the nut to spin freely in one direction and to provide a one-way clutch to prevent the nut spinning in the other direction.

One feature of the present invention is to dispense with the thrust bearing.

Since the piston travel in the case of the hydraulic actuator depends not only upon the normal running clearance of the brake pads but also upon the deflection of the caliper or other brake part under the strain of the force developed when the maximum expected brake pressure is applied, it is desirable for the automatic adjustment to be responsive to excess piston travel needed to take up the running clearance but not to any piston travel arising due to brake deflection. Otherwise the automatic adjuster has to be designed to provide a rather large clearance takeup travel to avoid the risk of the brakes binding after adjustment consequent upon heavy brake application.

Another feature of the invention is to provide an automatic adjuster which is responsive only to the normal piston travel to take up the running clearance but which does not operate once a braking force is applied.

A further feature of the invention is to provide for a clutching action wherein thrust is applied to one of the elements of the reversible screw thread connection to urge this element into frictional engagement with a movable brake member and so prevent said element from rotating when the brake pressure is developed.

The present invention provides an automatic adjuster for a hydraulic brake system comprising first and second screw elements having a reversible screw thread connection therebetween and associated respectively with opposed first and second components of a hydraulic actuator, said members being adapted to apply a thrust to respective brake pads or shoes when hydraulic pressure is applied to said members urging said pads into frictional engagement with a rotary friction disc, drum or the like.

A further feature of the invention is that the hydraulic pressure is effectively applied to one of said screw elements and, when brake slack is developed due to lining wear, said one element is axially displaced by the hydraulic pressure to cause it to rotate on the other element and so take up the slack before the next brake application. Another feature of the invention is that, when the slack is taken up, free rotation of said elements relative to one another is prevented by frictional torque arising from the thrust applied by the application of hydraulic pressure.

The adjuster can be operative between one of said actuator components and a mechanical actuator in the other of said actuator components.

In a preferred embodiment of the invention, the brake actuator comprises a piston and a counter-component such as another piston slidable in a common bore with the first mentioned piston or a cylinder in which the piston slides. The auxiliary mechanical actuator is provided in the counter-component and the automatic adjuster is operative between the piston and the mechanical actuator. The mechanical actuator acts on one element of the screw thread connection and either the other element is attached to or forms effectively part of the piston or it comprises a separate auxiliary piston movable into abutment with the actuator piston. In the former case lining wear leads to the development of a clearance between the piston and the member, such as the brake pad or shoe, upon which the piston operates. When the brake is next applied the normal running clearance, which may be provided at the screw thread connection or elsewhere, is taken up before the piston clearance is taken up and the piston can turn on the screw thread connection to provide automatic adjustment to take up the excessive slack. As soon as piston clearance has been taken up, the brake applying force is transmitted from the piston to the brake pad or shoe and the frictional torque thereby developed prevents the piston from rotating further. In the case wherein an auxiliary piston is employed, lining wear leads to clearance between the actuator piston and the auxiliary piston and the hydraulic pressure acting in the auxiliary piston takes up this clearance to effect the automatic adjustment, until the force produced by the hydraulic pressure acting on the auxiliary piston is greater than the spring force.

Figure 2:
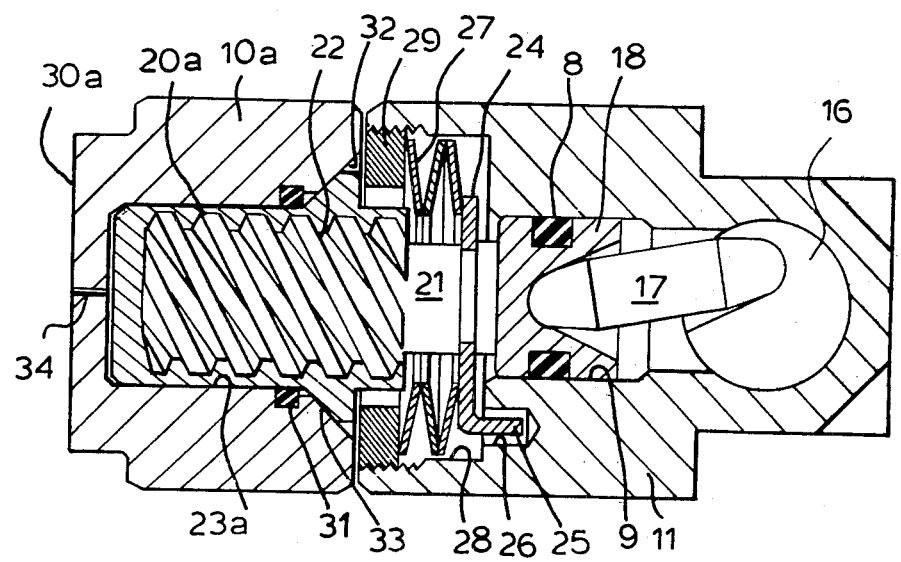

The invention is further described, by way of example, with reference to the accompanying drawings, in which:

FIG. 1 is a cross-sectional view of a brake actuator fitted with an automatic adjuster in accordance with one embodiment of the invention, and FIG. 2 is a similar view of a second embodiment.

Referring to FIG. 1 of the drawings, a hydraulic actuator for a disc brake comprises opposed pistons 10 and 11 slidable in a through bore 12 in a body member 13. The piston 10 acts upon a directly operated pad 14 which cooperates with one face of a disc (not shown). The piston 11 acts upon a yoke 15 (only part of which is shown) slidably mounted on the body member 13 and acting upon another pad (also not shown) cooperable with the other face of the disc. The disc brake may be constructed as described in British Specification No. 1,075,371.

An auxiliary mechanical actuator is fitted to the piston 11 and comprises a cam 16 journaled in this piston for rotation about an axis perpendicular to the actuator axis. The cam 16 acts through a dolly 17 and a plunger 18 upon one end of an automatic adjuster 19 whose other end cooperates with the piston 10. The plunger 18 is slidable in a bore 9 in the piston 11 and is sealed thereto by a sealing ring 8. The adjuster comprises a nut 20 and a rod 21 having a reversible screw thread connection 22 therebetween. A reversible screw thread connection is a connection such that axial displacement to one element can cause rotation of the other element and vice versa. This property is dependent upon the pitch angle, the flank angle and the coefficient of friction of the screw thread connection. The nut 20 is secured in a counter bore 23 in the piston 10 but can be formed integrally with this piston if preferred. One end of the rod 21 is in abutment with the plunger 18 but can be formed integrally therewith if desired. A ring 24 is locked in a groove in the rod 21 adjacent the plunger 18 and has a tab 25 bent so as to extend axially into a small offset bore 26 in the piston 11. This prevents the rod 21 from rotating relative to the piston 11 which is itself prevented from rotating by the yoke 15. A spring 27, in the form of a stack of Belleville washers, is housed in a shallow counter bore 28 in the piston 11 and acts between a bush 29 screwed into the mount of this counter bore and the ring 24 to hold the rod 21 against the plunger 18 and thereby hold this rod captive on the piston 11.

To apply the brakes hydraulically, hydraulic fluid is supplied between the pistons 10 and 11 to urge these pistons apart. The piston 10 acts by its end face 30 upon the rear face 31a of the back plate 31 of the pad 14. The piston 11 acts on the other pad through the yoke 15. The normal running clearance is provided by axial displacement at the screw thread connection 22 and normally the piston 10 is not separated from the pad 14. When pad wear takes place the pad 14 does not move back to quite the same position upon release of the brake so that a small clearance develops between the piston face 30 and the pad back plate 31 because the spring 27 retracts the piston 10. The next time the brake is applied hydraulically the clearance at the screw thread connection 22 is taken up before thrust can be transmitted to the pad 14 at the piston face 30. The piston 10 is free to rotate and is caused to rotate on the screw thread as this excessive clearance is taken up. As soon as the pad abuts the disc a thrust is transmitted at the face 30 and the frictional torque thereby developed prevents the piston 10 from rotating further. Thus adjustment can only take place while excessive running clearance is being taken up and overadjustment is prevented from taking place upon brake distortion arising from heavy brake application, the additional piston travel being permitted by compression of the spring 27.

When the brake is applied mechanically the thrust developed at the face 30 prevents the piston 10 from rotating.

The embodiment of FIG. 2 is in many respects similar to the embodiment of FIG. 1 and like parts are denoted by the same reference numerals. In this embodiment however, the nut of the screw thread connection 22 is separated from the piston 10a and comprises an auxiliary piston 20 slidable in a bore 23a in the piston 10a. A sealing ring 31 seals the auxiliary piston 20a to the actuator piston 10a. The mouth of the bore 23a has a conical surface 32 which can be engaged by a complementary surface 33 on the auxiliary piston 20a when hydraulic pressure acts upon the auxiliary piston. The bore 23a can be formed as a blind bore and a small bleed opening 34 serves to prevent buildup of pressure at the left of the auxiliary piston 20a. The embodiment of FIG. 2 operates in the same manner as the embodiment of FIG. 1 but axial clearance is developed between the conical surfaces 32 and 33 on the actuator piston 10a and the auxiliary piston 20a when lining wear takes place rather than at the end face 30a of the piston 10a and the piston 10a does not rotate when automatic adjustment is taking place. The piston 10a prevents the piston 20a from rotating when thrust is being applied to the brake pads hydraulically or mechanically.

I claim:

1. In a vehicle brake system having first and second members movable relative to one another upon brake application: an automatic slack adjuster disposed between said members and comprising first and second elements associated respectively with said first and second members; a reversible screw thread connection between said screw elements; means for urging said screw elements in an axial direction relatively to one another responsively to excess travel between said members to cause one of said screw elements to advance along the other of said screw elements and thereby reduce the brake slack; means for inhibiting reverse rotation of said first screw element; and means for preventing rotation of said second screw element, said first member being normally nonrotating, said reverse rotation inhibiting means comprising friction surfaces associated with said first screw element and said first member and urged into abutment with one another by the brake applying thrust upon brake application whereby said relative advance of said screw elements can only take place during takeup of slack.

2. An adjuster according to claim 1 further including a hydraulic actuator comprising opposed first and second relatively movable components of which the first component is associated with said first screw element, and an auxiliary mechanical actuator fitted to said second component, said mechanical actuator acting on said second screw element.

3. An adjuster according to claim 2 in which said second actuator component has a bore therein and a plunger slidably received in said bore, said mechanical actuator acting upon said second screw element through said plunger.

4. An adjuster according to claim 3 further comprising a spring acting between said second screw element and said second actuator component and urging said second screw element relatively towards said mechanical actuator.

5. An adjuster according to claim 4 further comprising a bush screwed into said second actuator component and a ring fixed to said second screw element, said spring being disposed between said brush and said ring, said second actuator component having an axially offset bore therein and said ring having an axially directed tab thereon engaging axially displaceably in said offset bore.

6. An adjuster according to claim 3 in which said mechanical actuator comprises a cam journaled in said second actuator component about an axis transverse to the axis of said component.

7. An adjuster according to claim 1 further comprising a hydraulic actuator having first and second relatively movable actuator components, said first screw element forming a part of said first actuator component and said second screw element being associated with said second actuator component, said friction surfaces being disposed relatively on said first actuator component and on said normally nonrotating member and normally abutting one another.

8. An adjuster according to claim 1 further comprising a hydraulic actuator having first and second actuator components of which the first component constitutes said normally nonrotating member and the second component is associated with said second screw element, and in which said first screw element comprises a nut, said friction surfaces being disposed respectively on said first actuator component and on said nut and normally abutting one another.

9. An adjuster according to claim 8 in which said friction surfaces are frustoconical.

10. An adjuster according to claim 8 wherein said first actuator component has a concentric bore therein and said nut is axially displaceable in said concentric bore, means being provided sealing said nut to said axial bore.

11. An adjuster according to claim 2 in which said hydraulic actuator includes a fixed body member having a through bore and in which said actuator components comprise opposed pistons slidable in said bore.

12. An adjuster according to claim 11 for a spot-type disc brake which includes a yoke slidably supported on said body member and directly and indirectly operated friction pads, said first piston acting on said directly operated pad, said second piston acting on said yoke and said yoke acting on said indirectly operated pad.

* * * * *